United States Patent [19]

Costinel

[11] Patent Number: 5,603,825
[45] Date of Patent: Feb. 18, 1997

[54] MULTI-STAGE APPARATUS FOR SEPARATING IMMISCIBLE FLUIDS

[76] Inventor: Paul Costinel, #40 - 5500 - 48B Avenue, Delta, British Columbia, Canada, V4K 4G7

[21] Appl. No.: 277,433

[22] Filed: Jul. 18, 1994

[51] Int. Cl.$^6$ ...................................................... C02F 9/00
[52] U.S. Cl. .......................... 210/109; 210/138; 210/258; 210/259; 210/265; 210/266; 210/512.1; 210/DIG. 5
[58] Field of Search ..................................... 210/693, 788, 210/799, 806, 807, 109, 117, 136, 138, 258, 259, 265, 266, 416.1, 512.1, 512.2, 512.3, DIG. 5, 257.1

[56] References Cited

U.S. PATENT DOCUMENTS

| | | | |
|---|---|---|---|
| 3,444,077 | 5/1969 | Finch | 210/265 |
| 4,139,463 | 2/1979 | Murphy | 210/DIG. 5 |
| 4,743,382 | 5/1988 | Williamson et al. | 210/807 |
| 5,120,435 | 6/1992 | Fink | 210/265 |

*Primary Examiner*—Ivars Cintins
*Attorney, Agent, or Firm*—Oyen Wiggs Green & Mutala

[57] ABSTRACT

A compact multi-stage oil-water separator which has application in removing oily contaminants from bilge water in ships is disclosed. The oil-water separator has two toroidal mechanical separation stages on the suction side of a feed pump, and a cyclone separation stage and a filtration stage on the output side of the pump. The cyclone separation and filtration stages are located inside the mechanical separation stages for compactness. The oil-water separator has built-in fail-safe operation to prevent the accidental discharge of water in the case of contaminated sensors.

20 Claims, 10 Drawing Sheets

MULTI-STAGE APPARATUS FOR SEPARATING IMMISCIBLE FLUIDS

FIELD OF THE INVENTION

This invention relates to a method and apparatus for separating immiscible fluids having different densities. The invention may be used for separating oily substances from water and has particular application in separating waste oil from bilge water in ships.

BACKGROUND OF THE INVENTION

Bilge water in ships is often contaminated with oil containing various residues. To prevent polluting the marine environment it is necessary to remove as much of the oil as possible from the bilge water before the bilge water is discharged overboard. The separation process can be particularly difficult where the input to the separator is an emulsion of oil and water. In an oil/water emulsion, fine droplets of oil are dispersed in water, the oil particles being too small to settle out. Prior art separators capable of dealing with oil/water emulsions have employed costly methods.

Prior art oil-water separators are often bulky, inefficient, susceptible to clogging and/or difficult to operate. Some prior art separators employ filters to separate immiscible fluids. Filters in such separators are prone to clogging if the separator does not provide an effective mechanical separation stage prior to the filters to remove oil and its various residues. Consequently, these separators require frequent and labour intensive filter replacements which can render them economically infeasible.

Centrifuge-type separators comprise rotating parts which are susceptible to wear and break downs. Such separators are costly to operate because they require expensive replacement parts.

Hydrocyclones can produce an effluent with an oil content of 50 parts per million (ppm), which fails to meet the 15 ppm maximum imposed by International Maritime Organization (IMO) or United States Coast Guard (USCG) regulations. When two or more hydrocyclones are used in series to reduce the oil content, the recovered oil contains a substantial amount of water which makes the recovered oil difficult to store or reuse. Injecting pure water or chemical substances for improving the performance of prior art hydrocyclones is wasteful. Moreover, hydrocyclones are prone to erosion damage which, in an extreme case, could result in an oil spill.

In some units the separation is carried out downstream from a feed pump. However, the feed pump may emulsify the oil-water mixture that it is delivering to the separator. This makes it difficult to achieve a good separation.

In other prior art designs the entire separation process takes place in a tank prior to the feed pump in order to avoid emulsification. However, in such systems it is almost impossible to remove all of the oil from the separation stages. The remaining oil tends to gradually build up and contaminate the effluent.

Some prior art oil-water separators provide a tank for preliminary separation prior to a feed pump and another tank containing filters on the discharge side of the pump. This arrangement avoids emulsification and makes it possible to keep the filter tank clean by eliminating the coalesced oil at all times. However, this arrangement is wasteful of space which is at a premium aboard ships.

SUMMARY OF THE INVENTION

This invention provides a multi-stage apparatus for separating an immiscible fluid, such as oil, from a fluid, such as oily water from the bilge of a ship. The apparatus may be made in a compact form which is easy to install and operate. Furthermore, the apparatus may be constructed so that its operation is not significantly affected by the movement of a ship.

One aspect of the invention provides a separator for removing an immiscible fluid from a fluid denser than the immiscible fluid. The separator provides a path for flow of fluid through the separator from an inlet to an outlet. The separator comprises: a toroidal separation chamber in the path downstream from the inlet the separation chamber having a tangentially disposed inlet for causing the influent fluid to swirl within the separation chamber; a pump in the path, the pump having a suction port and a discharge port, the suction port in fluid communication with and downstream from the separation chamber; and a bed of buoyant oleophilic plastic beads in the path and downstream from the separation chamber.

In a preferred embodiment of the invention the beads are polyethylene beads which are preferably in the range of 1–10 mm in diameter and are most preferably approximately 3 mm in diameter. The separator preferably further provides a hydrocyclone chamber in the path between the pump discharge port and the outlet. The hydrocyclone chamber preferably comprises a generally conical chamber having a larger diameter end and a smaller diameter end, an input nozzle tangentially disposed at the larger diameter end and a chamber outlet at the smaller diameter end.

Another aspect of the invention provides an oil-water separator comprising: a first toroidal separation chamber having a tangentially disposed fluid inlet on an outer wall thereof an oil collection zone above the fluid inlet and an annular outlet at a lower end thereof; a second toroidal chamber generally coaxial with and inside the first toroidal separation chamber, the second toroidal chamber having a second oil collection zone at an upper end thereof an outwardly inclined perforated plate at a lower end thereof, and a toroidal bed of polyethylene beads floating between the perforated plate and a fluid permeable member above the plate; a settling chamber in fluid communication with the second toroidal chamber; a pump having a suction port in fluid communication with the settling chamber and a discharge port; a hydrocyclone chamber disposed generally coaxially inside the second toroidal chamber, the hydrocyclone chamber having a larger diameter end and a smaller diameter end, a tangential fluid inlet in fluid communication with the pump discharge port at the larger diameter end, a tube axially disposed within the chamber, the tube having a perforated wall in a region toward the larger diameter end of the hydrocyclone chamber an annular outlet at the smaller diameter end of the hydrocyclone chamber and a diffuser plate extending outwardly from the tube and spaced apart from the annular outlet; an oil collection area above the diffuser plate and above an upper end of the tube; a conduit extending from the oil collection area to the second oil collection zone; a third chamber below the diffuser plate extending around the hydrocyclone; a conduit for carrying fluid from the third chamber to a filter in a filter chamber; a conduit extending from an upper region in the filter chamber to the second oil collection zone; and an effluent outlet in said filter chamber.

A third aspect of the invention provides a method for separating oil from a watery fluid. The method comprises the steps of: swirling the watery fluid around a toroidal chamber and collecting oil particles which rise to an oil collection zone in a top portion of the toroidal chamber; withdrawing fluid from a lower portion of the toroidal chamber around a baffle and collecting dense sludge which falls out of the fluid; coalescing oil particles which remain in the fluid by passing the fluid upwardly through a bed of freely floating oleophilic plastic beads and collecting oil particles which are released by the beads; drawing the fluid through a pump; and discharging effluent fluid through an outlet. A preferred embodiment of the method further includes the step of breaking down emulsified oil entrained in the fluid by passing the fluid through an oil layer and absorbing the emulsified oil in the oil layer. Preferably the thickness of the oil layer is maintained relatively constant.

Preferably the method further comprises the step of passing the fluid through a filter after the step of swirling said fluid in a hydrocyclone chamber. More preferably the method also includes the step of passing the fluid through a filter prior to discharging the effluent. Most preferably the step of passing the fluid through a filter includes collecting oil which accumulates inside the filter.

BRIEF DESCRIPTION OF THE DRAWINGS

In drawings which illustrate specific embodiments of the invention, but which should not be construed as restricting the spirit or scope of the invention in any way.

DETAILED DESCRIPTION OF THE PREFERRED EMBODIMENT

The operation of the invention will be described in the context of separating oil from water on board a ship. However, the method and apparatus of the invention may be used to separate other immiscible liquids having different densities as will be apparent from the following explanation.

Figure 1:
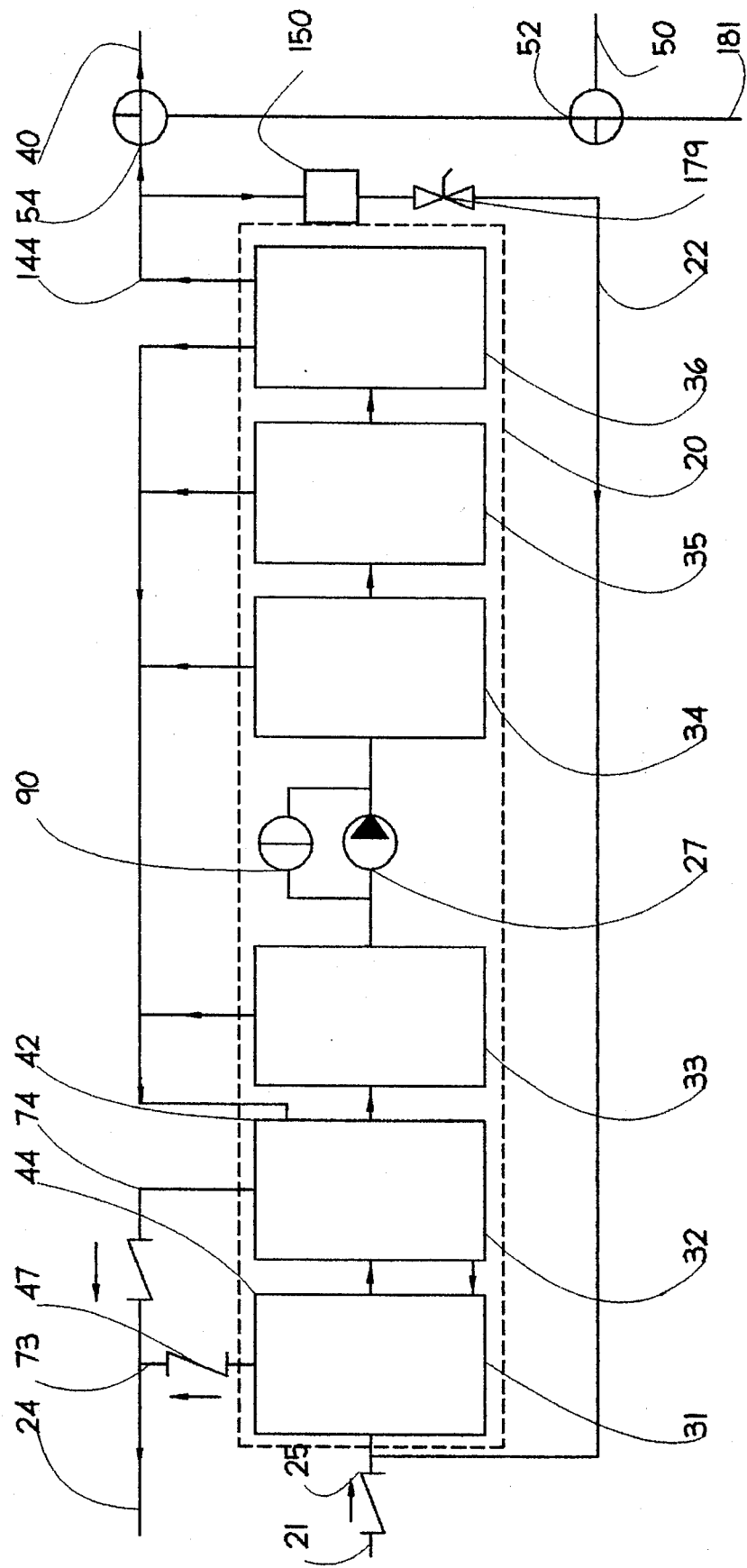
FIG. 1 is a block diagram of a preferred embodiment of the invention.

As shown in FIG. 1, water contaminated with oil enters oil-water separator 20 through pipe 21 and inlet valve 25. Feed pump 27 draws the oil-water mixture through a preliminary mechanical separation stage 31 a first mechanical coalescent separation stage 32 and a second mechanical separation stage 33. Feed pump 27 then expels the oil-water mixture through a centrifugal separation stage 34, a second mechanical coalescent separation stage 35 and a coalescing filtration stage 36. Cleaned water exiting from coalescing filtration stage 36 is discharged through outlet 40.

Waste oil separated in stages 32 through 36 is collected in a secondary collection zone 42. First stage 31 separates the coarsest globules of oily substance from the contaminated water and effects a preliminary mechanical separation of entrained particles which are denser than water. Waste oil collected by primary mechanical separation stage 31 is collected in a primary collection zone 44. As described below, waste oil in secondary collection zone 42 and primary collection zone 44 can be purged through one-way valves 46 and 47 to a holding tank 170 (not shown in FIG. 1).

As will be discussed below, a pressurized water supply line 50 is coupled to oil-water separator 20 through a valve 52 for filling and purging oil-water separator 20. A fluid recirculation valve 54 is also provided.

Figure 2:
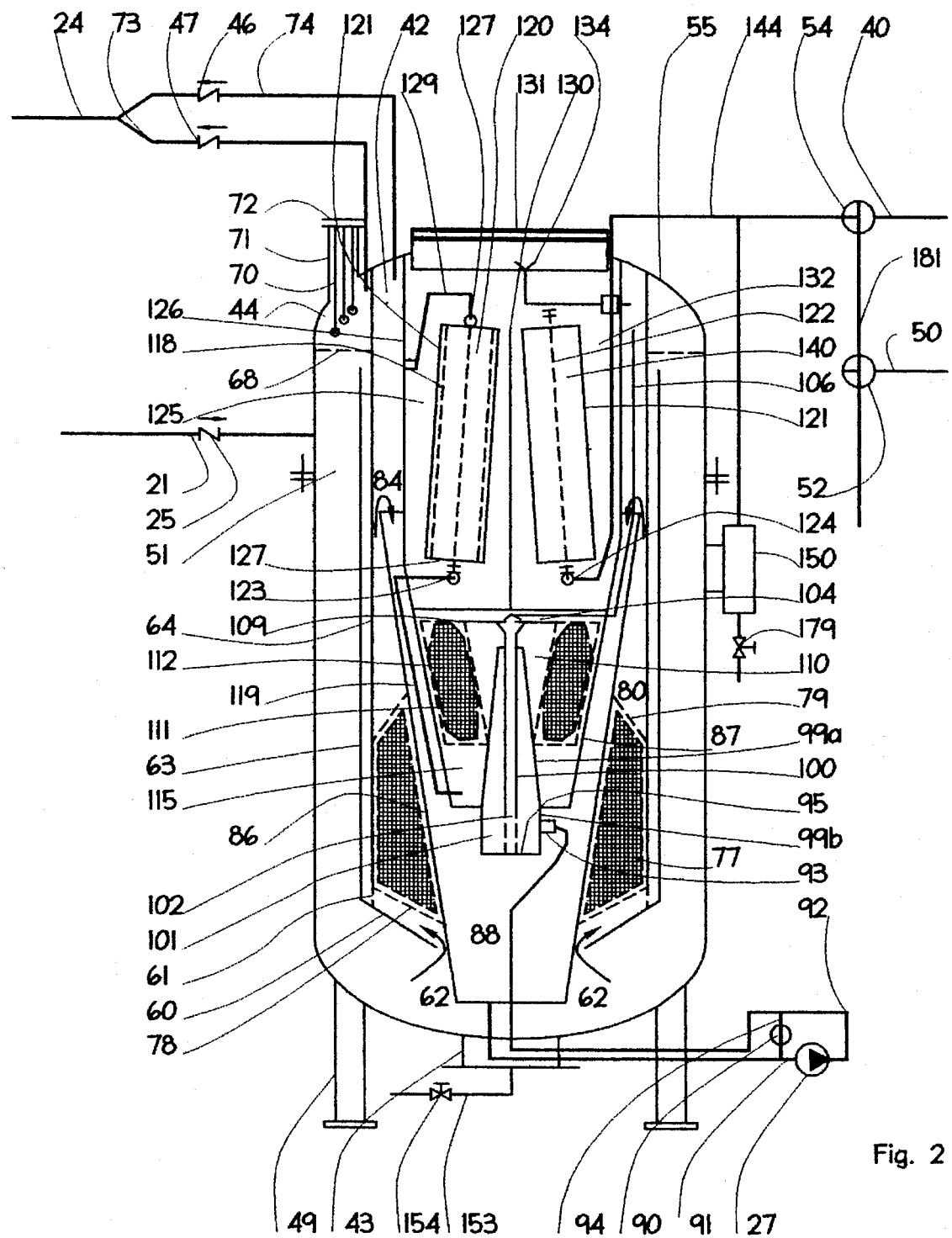
FIG. 2 is an elevational section through an oil-water separator according to the invention.

As shown in FIG. 2, oil-water separator 20 comprises a pressure tank 55. Tank 55 may comprise a pair of domed flanged shells bolted together around their flanges. Tank 55 is supported on legs 49.

First stage 31 includes annular chamber 51 between the side walls of tank 55 and a cylindrical concentrically mounted baffle wall 63. Fluid enters annular chamber 51 tangentially through check valve 25. Check valve 25 prevents the flow of fluid from being reversed when separator 20 is backflushed (as described below). The fluid swirls downward through chamber 51 and then flows around the bottom end of a frusto-conical wall 60 as indicated by arrows 62. Wall 60 extends downwardly and inwardly from the lower edge of baffle wall Chamber 51 permits large globules of oily substances to float upwardly through perforations in an annular plate 68 into primary collection zone 44 from where they can be drawn off through a conduit 73 to holding tank 170. Plate 68 keeps flow in primary collection zone 44 to a minimum and helps oily substances which accumulate in primary collection zone 44 to settle before being evacuated into holding tank 170. A check valve 47 is provided in conduit 78 to prevent air from being drawn into first stage 31 during the separation process.

Oil sensor probes 70 which are preferably conductance-type probes may be provided to alert an operator when primary collection zone 44 is nearly full and/or to trigger an automatic sequence for evacuating collected oily substances from primary collection zone 44. Probes 70 may be threaded into the lid 72 of tank 55 through a nipple 71 welded to the top of tank 55.

As water flows around plate 60 coarse particles entrained in the water which are denser than water are deflected toward collector 43 on the bottom of tank 55 where they settle as a layer of sludge. Removing such dense coarse particles in first stage 31 prevents the coarse particles from entering subsequent stages of separator 20 (which are discussed below). This reduces erosion of parts of those subsequent stages, such as hydrocyclone 95, and prevents clogging of filters 120 or 140. A drain pipe 153 is connected to the bottom of sludge collector 43. Valve 154 on pipe 153 can be opened to draw off sludge which has collected in sludge collector 43.

A feature of the invention is that apparatus according to the invention may be very compact. This may be accomplished by constructing separator 20 so that first stage 31 (comprising chamber 51 and primary collection zone 44) surrounds subsequent stages of the apparatus. Compact apparatus saves space and is simple to install.

As water follows arrow 62 around the bottom of wall 60 it enters second stage 32 of FIG. 1. Second stage 32 occupies a chamber 80 between a cylindrical baffle wall 64 and an inverted frustoconical baffle 86. Baffle wall 64 lies inside of and is concentric with baffle wall 63.

As water enters second stage 32 it encounters a slanted perforated plate 78. Oil which collects on perforated plate 78 moves upwardly and outwardly along plate 78 to baffle 64. The lower portion of baffle 64 has perforations 61 around its circumference to allow the passage of oil into the annular space between baffle 63 and baffle 64. The oil can float upwardly through this annular space into primary collection zone 44 without being disturbed by the fluid flow in chamber 51. Baffles 86 and 60 assist this process by deflecting part of the flow of water towards the periphery of chamber 80 as indicated by arrows 62. Perforations 61 in baffle 64 help to maintain the thickness of an oil layer on perforated plate 78 constant. As a less preferred alternative to baffle 64 a pipe may be connected to perforations 61 for withdrawing oil from the oil layer and carrying the oil upward to primary collection zone 44.

Figure 3:
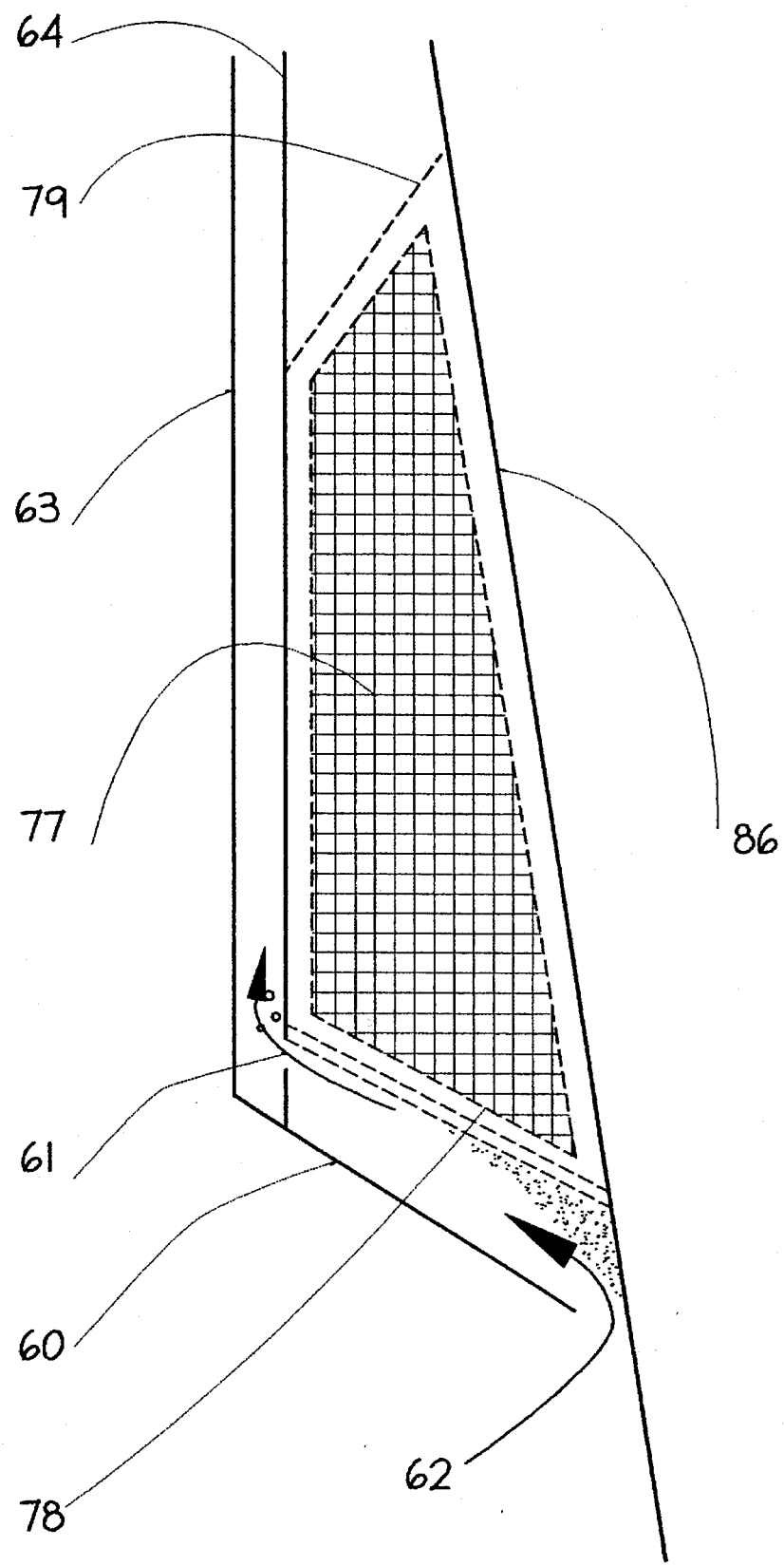
FIG. 3 is an elevational section through the second stage of the oil-water separator of FIG. 2.

As shown in FIG. 3, second stage 32 further includes an arrangement for absorbing emulsified oil. A bed of polyethylene beads 77 is provided in a generally toroidal region between plate 78 and a second annular perforated plate 79. Beads 77 are buoyant in water and float against a perforated plate 79. Preferably beads 77 have a density of less than 0.95 that of water. The diameter of the beads 77 is preferably in the range of 1 to 10 mm and is most preferably approximately 3 mm so that beads 77 have a relatively large surface area for collecting oil particles. Beads 77 are preferably not tightly packed. Beads 77 should be able to move relative to each other as liquid flows among them. As discussed below, the movement of beads 77 helps to clean beads 77 and promotes the coalescence of small oil particles into larger particles.

Polyethylene beads 77 aid in coalescing small droplets of oil into larger droplets of oil. The larger oil droplets float up through region 80 into secondary collection area 42. A conduit 74 is connected to the top of the secondary collection zone 42 to drain accumulated oil into holding tank 170. Conduit 74 preferably has a diameter approximately 4 times smaller than the diameter of conduit 73 due to the reduced amount of oil collected in the secondary zone 42. A check valve 46 is provided in conduit 74 to prevent air ingress into the second stage 32.

Water from region 80 exits second stage 32 and enters third stage 33 by flowing in the direction of arrows 84 -0 over the upper lip of baffle 86, through an annular passage between baffle 86 and a cone-shaped wall 87, and into a region 88 inside baffle 86. Region 88 is relatively large so that the velocity of water inside baffle 86 is relatively small. Oil droplets may separate from the water inside chamber 88 and float upwardly into secondary collection zone 42.

Water is withdrawn from the interior of baffle 86 through a conduit 91 by a pump 27. Pump 27 is preferably a positive displacement feed pump, such as a progressing cavity pump, having a capacity matched to the size of separator 20.

A bypass valve 90 is provided in parallel with pump 27. Bypass valve 90 is preferably a normally closed electrically activated 2-way ball valve. Bypass valve 90 can be opened to allow liquid to flow through conduit 94 in a reverse direction through separator 20, bypassing pump 27 during oil discharge or self-cleaning operations. Bypass valve 90 may also be temporarily opened when pump 27 is energized to reduce the start up load on the motor of pump 27.

The water discharged from pump 27 is fed through pipe 92 to fourth stage 34. Fourth stage 34 comprises inverted hydrocyclone 95, an axial tube 100 secured to the bottom of hydrocyclone 95 and a dispersion plate 109.

Figure 4:
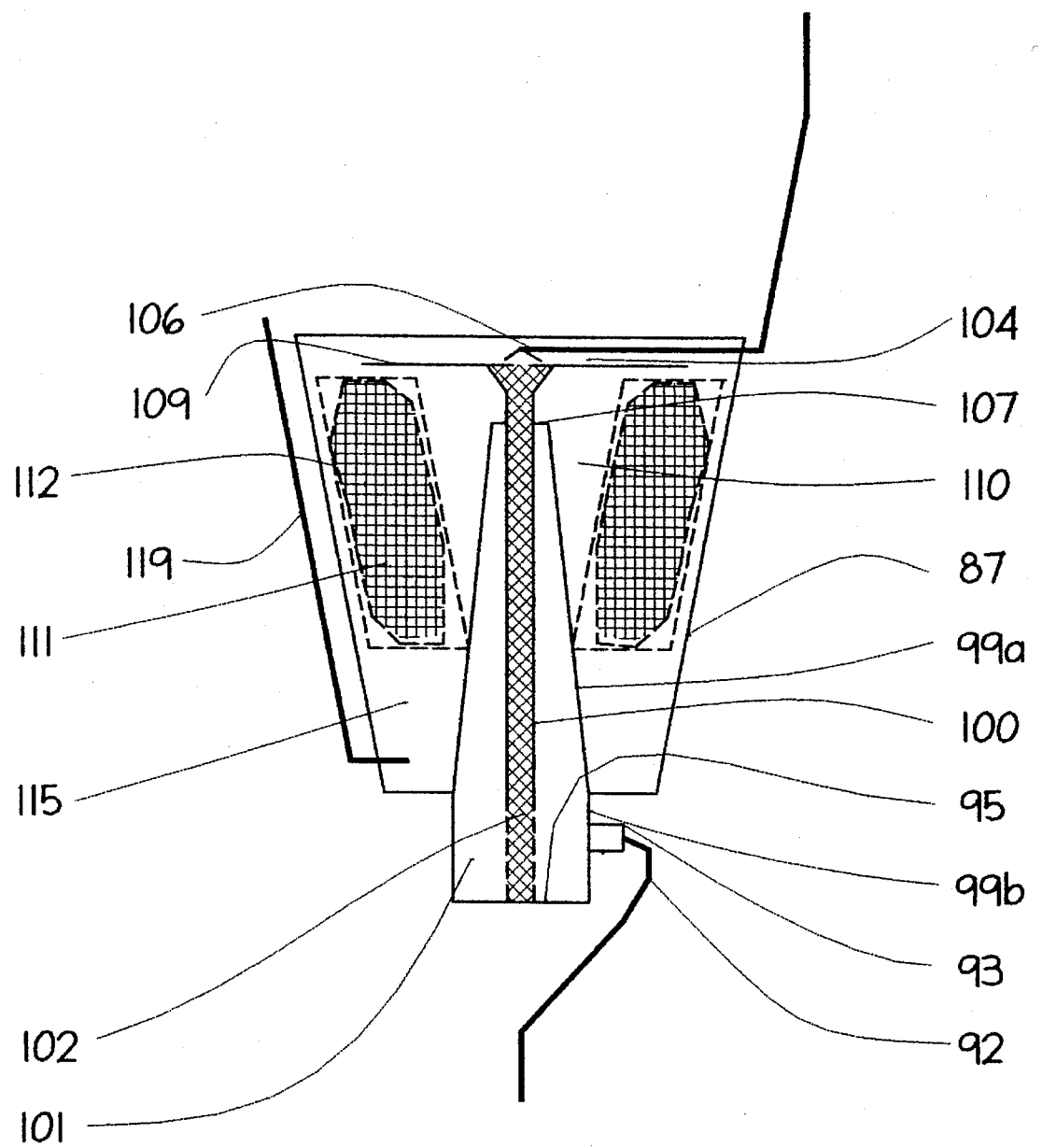
FIG. 4 is an elevational section through the hydrocyclone-dispersion plate assembly and the fifth stage of the oil-water separator of FIG. 2.

As shown in FIG. 4, hydrocyclone 95 comprises a chamber 101 defined by a frustoconical plate 99a joined to a cylindrical wall 99b, and a tube 100 axially located within chamber 101. Chamber 101 is generally symmetrical with respect to tube 100. Pipe 92 delivers water through a flattened nozzle 93 which enters chamber 101 tangentially through wall 99b. Water flowing into chamber 101 through nozzle 93 causes water inside chamber 101 to flow in a high velocity vortex. Chamber 101 preferably has a diameter to length ratio of approximately 1 to 5. The height of wall 99b is preferably equal to the diameter of chamber 101 inside wall 99b.

Oil particles entrained in the water inside chamber 101 tend to move away from plate 99a and wall 99b and are concentrated around tube 100. The lower part of tube 100 is perforated to allow oil particles to migrate into the bore of tube 100. Preferably the bore of tube 100 is filled with polyethylene beads as described above. Tube 100 extends out of chamber 101 through an aperture at the upper end of plate 99a. The upper end of tube 100 is enlarged and supports a circular dispersion plate 109. Oil particles inside the bore of tube 100 float upwardly, leave tube 100 through orifices located in the central region of dispersion plate 109, and emerge into region 104 from where the oil is drawn through pipe 106 to secondary collection area 42.

While it is desirable, to a point, to increase the velocity of water in chamber 101 to increase the centripetal forces acting on the water in chamber 101 if those forces are too high then oil drops entrained in the water may be sheared and made more difficult to remove from the water. It has been determined experimentally that, for best operation of hydrocyclone 95, the size of nozzle 93 and the flow rate through chamber 101 should be set so that the centripetal forces acting on water particles near the outside of chamber 101 are approximately 4 to 5 times the force of gravity.

Water leaves chamber 101 through annular aperture 107 between tube 100 and plate 99a. As water leaves chamber 101 it enters stage 35. The components of stage 35 are located in a chamber 110 inside wall 87. The oil-water mixture exiting hydrocyclone 95 is extremely diluted, containing minute droplets of oil. Some oil droplets which may remain in the water leaving chamber 101 are projected against plate 109. Oil droplets coalesce further on plate 109. The resulting oil flows to the edges of plate 109 and floats into region 104 above plate 109. Oil is drawn out of region 104 through pipe 106 as described below.

After leaving chamber 101, water flows downwardly through region 110 between the outer wall 99a of chamber 101 and wall 87. As the influent water leaves chamber 101 in a spinning motion it is drawn downwards to the periphery of region 110. The combined effect of centrifugal and gravitational forces in region 110 prevents most of the oil which is still entrained in the water from reaching the bottom of region 110.

A second bed 111 of polyethylene granules retained inside a mesh wall 112 is preferably provided inside region 110. Fluid must flow through bed 111 to leave region 110. Oil particles may coalesce on the polyethylene beads in bed 111 and become large enough to float upwardly into region 104.

Water passes through bed 111 into region 115 at the bottom of chamber 110. From region 115 water is forced through a conduit 119 into a manifold 123 which lies within a filter chamber 126 (as shown in FIG. 2). The wall forming the bottom of chamber 126 may also form the roof of area 104. A separation plate 130 divides chamber 126 into two regions 125 and 132.

Filter chamber 126 is preferably concentric with the baffle 64 and is attached to the top of tank 55. The volume of chamber 126 is preferably approximately three times larger than the volume of chamber 110. Preferably, the total volume of tank 55 is roughly 2.5 times greater than the volume of chamber 126. The top of filter chamber 126 is preferably closed by a removable lid 131. Lid 131 seals chamber 126 and provides easy access to filters 120, and 140.

Manifold 123 delivers the water to the interior of one or more coalescing filters 120. Water passes outwardly through coalescing filters 120 into region 125. Oil particles are trapped within coalescing filters 120 and are drawn off through pipes 129 to secondary collection zone 42. Oil is driven through pipes 129 by a pressure differential between the ends of pipes 129. The pressure differential arises because the interior of filters 120 is on the discharge side of pump 27 while secondary collection zone 42 is on the suction side of pump 27. The lifetime of coalescing filters 120 is extended because much of the oil and oil residues present in the influent to separator 20 is removed before the influent liquid reaches filters 120.

Figure 5:
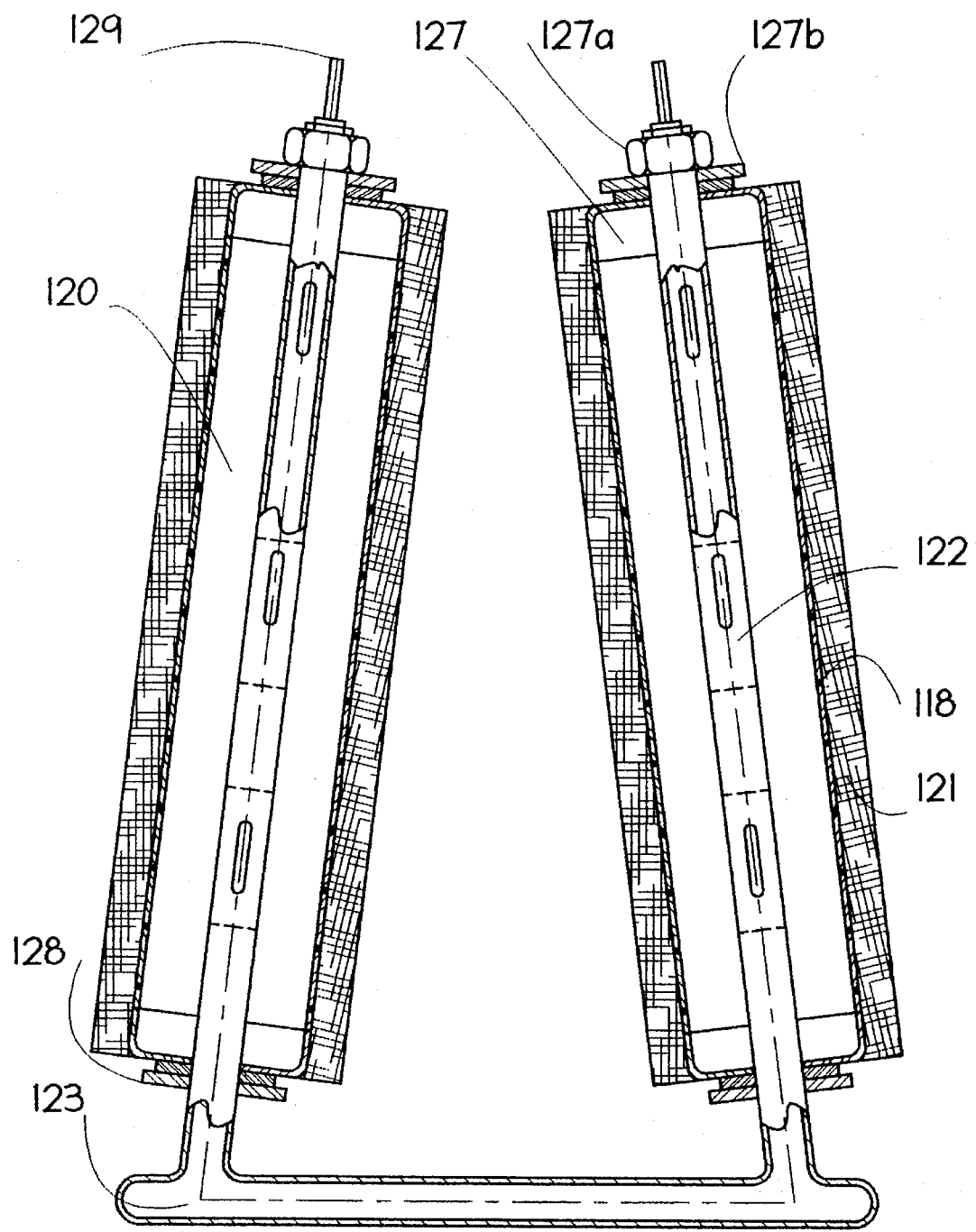
FIG. 5 is an elevational section through the first coalescing filter assembly of the oil-water separator of FIG. 2.

As shown in FIG. 5, each filter 120 may comprise a cylindrical screen 118 capped by circular plates 127. A layer 121 of a suitable filter media, such as a polypropylene filter material is supported by screen 118.

A slotted tube 122 is mounted coaxially inside screen 118. Fluid flows from manifold 123 into tube 122 and then flows out through slots or perforations in the wall of tube 122 which distributes the flow uniformly towards the filter media 121. Filter 120 is supported by a ring 128 which is secured to the lower portion of tube 122. A nut 127a and a ring 127b seal and secure filter 120 around tube 122.

For greater efficiency of filters 120 the area, thickness and density of filter media 121 should be selected so that for the designed for rate of fluid flow through separator 20 fluid passes through filter media 121 in about 3 seconds.

A conduit 129 is provided to withdraw oil from the interior of filters 120. Conduit 129 passes through the wall of chamber 126 and connects the upper end of tube 122 to secondary collection zone 42. The cleanliness of the chamber 126 is maintained by means of a duct 134 which draws any trace of oil which collects at the top of chamber 126 into oil collection zone 42 (FIG. 2). The diameter of each of conduits 106, 129 and 134 is preferably eight times smaller than the diameter of the inlet line 21.

Water in area 125 flows over a dividing wall 130 into area 132. Water flows from area 132 into a further pair of coalescing filters 140. Coalescing filters 140 resist the passage of oil droplets. Oil droplets tend to coalesce on the surface of coalescing filters 140 and to eventually break free and float to the top of area 132 from where they are drawn off by conduit 134. Filters 140 are similar in construction to filters 120. They differ in that filters 140 do not contain a conduit for draining oil from their interiors. Filters 140 are a back up in case filters 120 malfunction.

Cleaned water flows from the interior of coalescing filters 140 through manifold 124, pipe 144 and electrically operated valve 54 to outlet port 40. Preferably the amount of oil in the cleaned water is monitored continuously by an oil content meter 150 to ensure that the quality of the cleaned water is acceptable at all times. Oil content meter 150 may, for example, measure oil concentration in the effluent fluid by detecting the increase in turbidity after ultrasonic emulsification. Oil content meter 150 may be connected between pipe 144 and pipe 21. Because the pressure is higher in pipe 144 than it is in pipe 21 small amounts of treated water flow through oil content meter 150 where the oil content is measured.

Oil content meter 150 may provide an alarm signal to alert an operator whenever the oil content in the cleaned discharge water is greater than a selected level. The alarm signal may also actuate valve 54 to cause the effluent fluid to be directed into the ship's bilge via conduit 181 and valve 52 when the oil content exceeds the limits imposed by local regulations.

As described below, valve 52 supplies water from the line 50 to separator 20 via line 181 and valve 54 during the backflushing sequence. Valves 52 and 54 are preferably electrically actuated 3 way valves. Preferably, valves 52 and 54 are in their normal working positions when electrical power is applied to the valve actuators and return to their "off" (stand-by) positions under the force of a spring when electrical power is shut off.

Figure 8A:
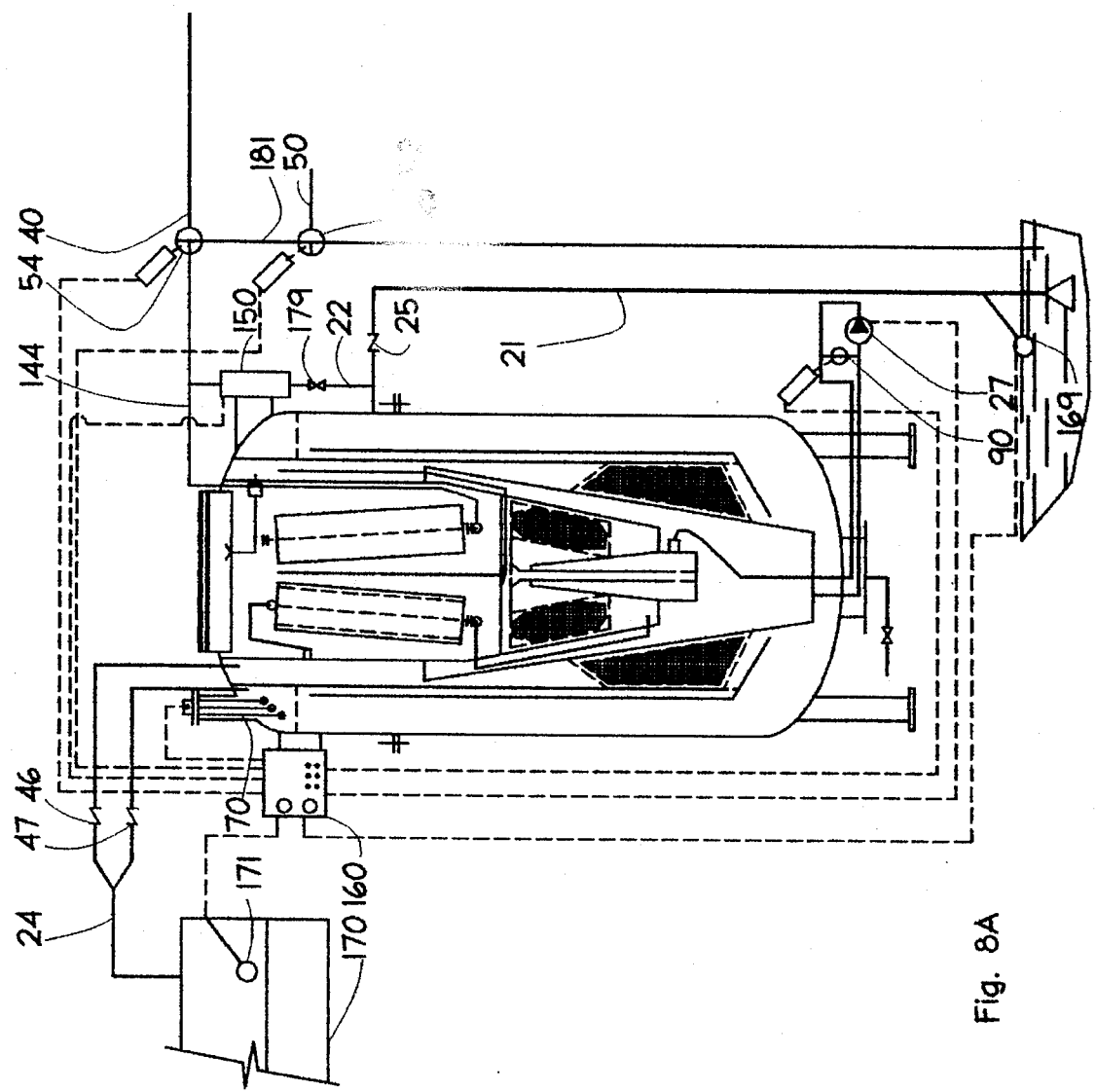

FIG. 8A shows separator 20 in its stand-by mode with pump 27, oil meter 150 valves 90, 52 and 54 de-energized. Valve 54 is positioned to block the flow of the effluent fluid from the separator to the overboard discharge line 40. Valve 52 isolates the water supply line from separator 20 and valve 90 is open for bypassing pump 27.

As described below, oil accumulated in primary collection zone 44 and secondary collection zone 42 is periodically discharged into a waste oil tank (not shown) and stored for recycling or reuse.

It can be appreciated that oil-water separator 20 can be made very compact by nesting the apparatus for separation stages 34, 35 and 36, which act on water exiting pump 27, inside the apparatus for stages 31, 32, and 33 which act on water being drawn into pump 27.

Figure 6:
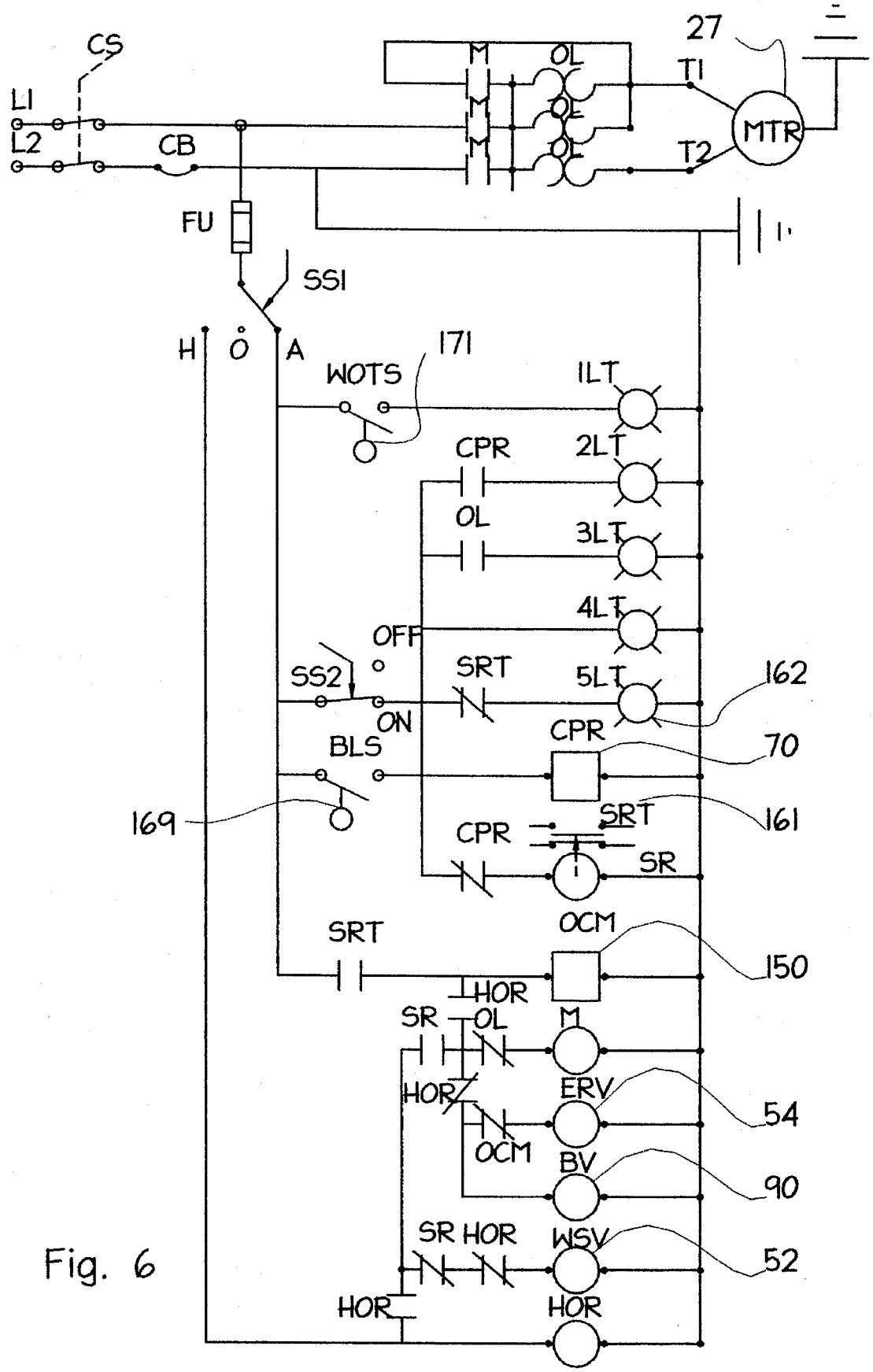
FIG. 6 is a block diagram showing the electrical circuitry of the oil-water separator of FIG. 2.
Figure 7:
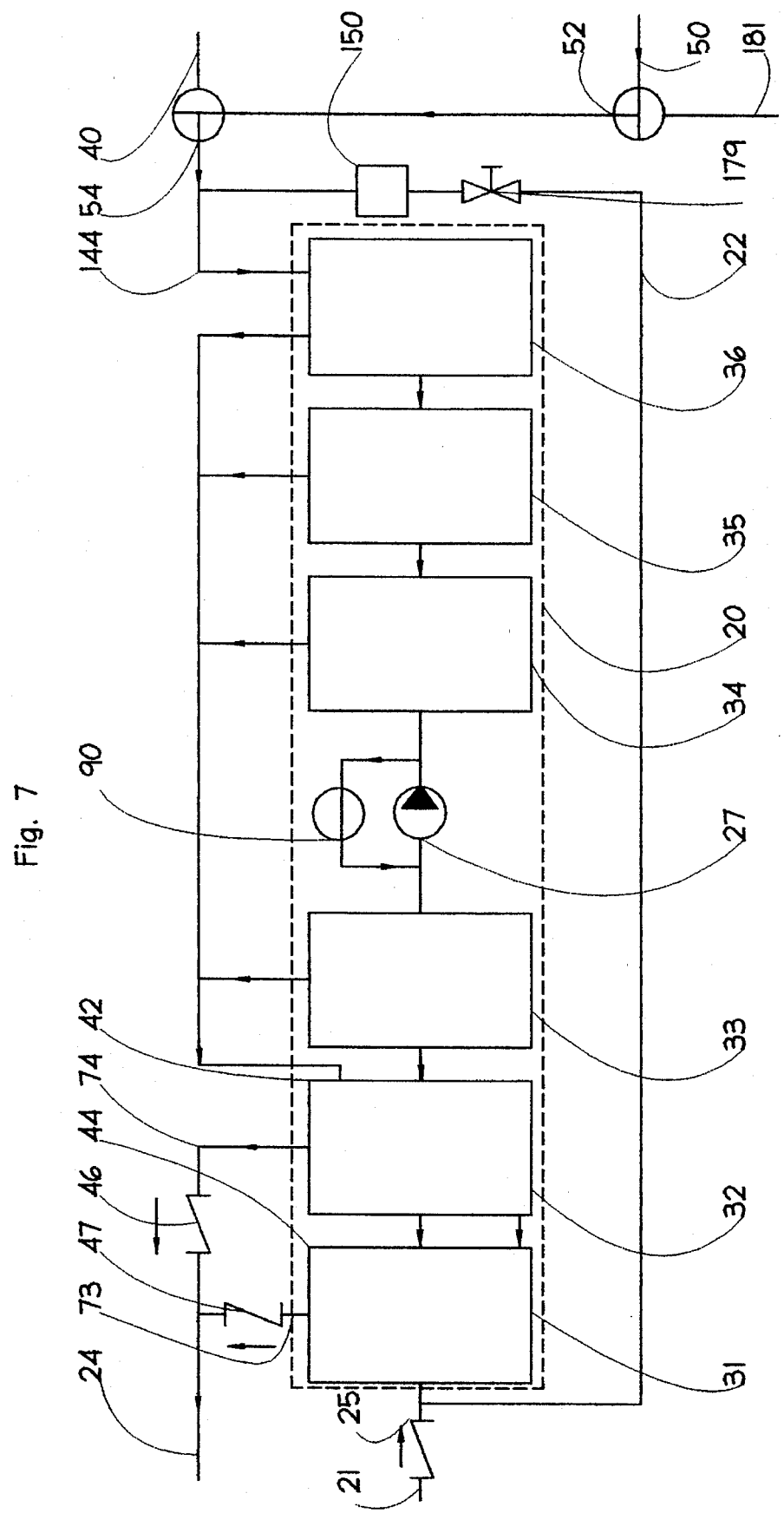
FIG. 7 is a block diagram showing the back-flush sequence for the oil-water separator of FIG. 2; and, FIGS. 8A through 8C show the configuration of the valves in the oil-water separator of FIG. 2 during various phases of operation.

The operation of separator 20 is coordinated by a control unit 160 (FIG. 6) which includes a conductance probe-type electronic module (CPR), a hand mode operation relay (HOR), a slave relay (SR) and a timer (SRT) 161. Timer 161 is preferably an off-delay timer which, when de-energised, actuates a pair of contacts after a delay interval. Control unit 160 receives signals from the sensors and controls the operation of pump 27 and the electrically actuated valves 52, 54 and 90.

Figure 8B:
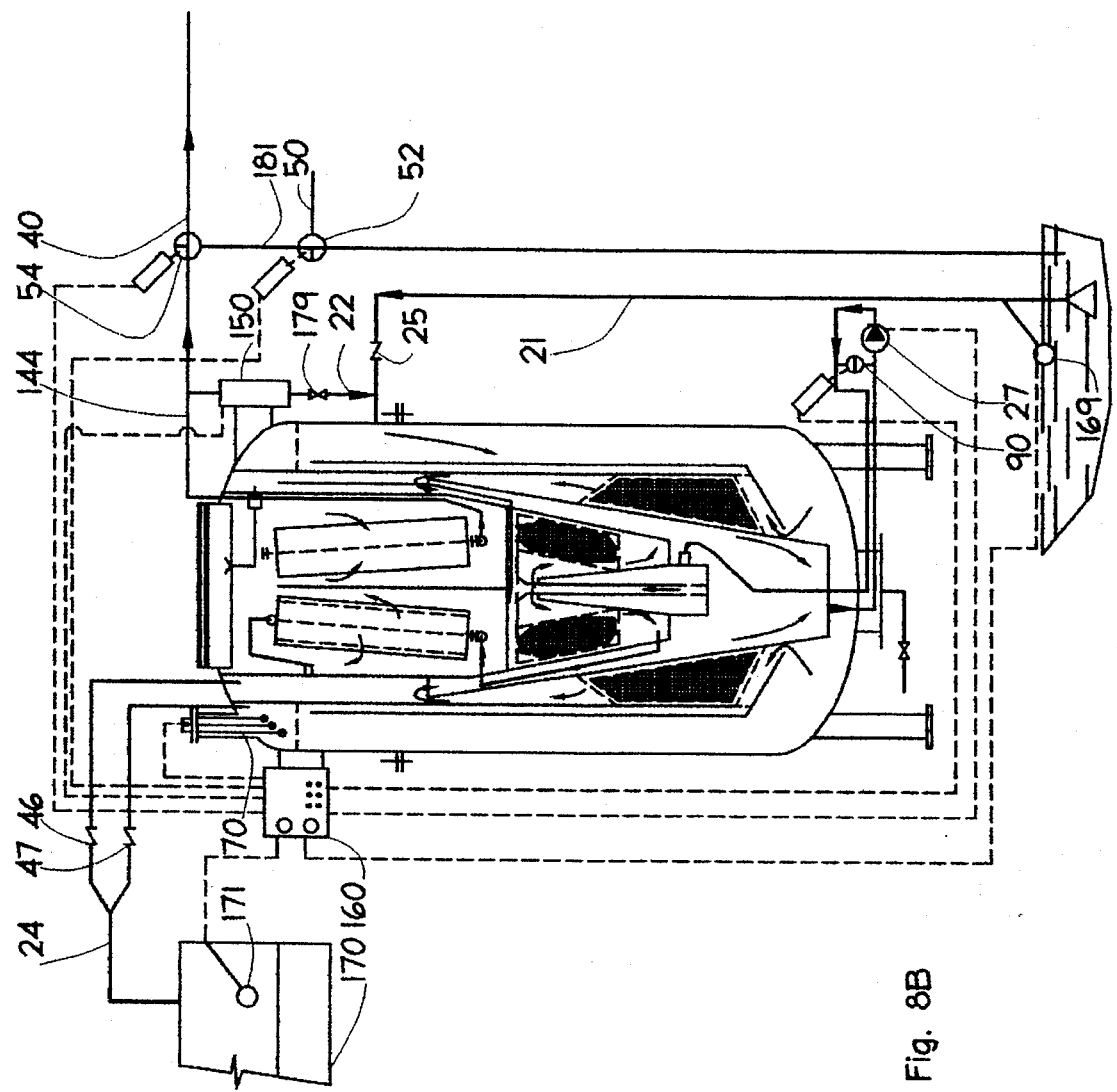

While the inventor does not wish to be bound by any particular theory of operation, separator 20 works as follows. Separator 20 is initially filled with clean water. As shown in FIG. 8B, a water level sensor 169, which may be, for example, a mercury level float switch, is mounted in the bilge of the ship. Sensor 169 signals control unit 160 when the liquid in the bilge rises to a predetermined level. In response to the signal from sensor 169, control unit 160 energizes oil meter 150 and feed pump 27. Control unit 160 then energizes the actuator for pump bypass valve 90. When valve 90 closes pump 27 begins to circulate the liquid through separator 20. At the same time the actuator for valve 54 is energized so that effluent processed by separator 20 is discharged overboard through line 40.

As shown in detail in FIG. 2, the oil-water mixture is drawn from the bilge through line 21 and check valve 25 and into the first stage of separator 20. As the fluid enters annular chamber 51 tangentially it undergoes a preliminary separation due to gravity and centrifugal force created by the circular motion of the fluid. Larger oil droplets float upwards in annular chamber 51 against the generally descending fluid flow. Most oil entrained in the fluid entering separator 20 is collected in primary collection zone 44 where it accummulates as a continuously growing oil layer.

Under the influence of the centrifugal force some oil drops are displaced inwardly toward baffle 63 where they can merge. The resulting bigger drops have an enhanced buoyancy and can float upwardly along baffle 63 into primary collection zone 44.

When the flowing liquid reaches the bottom of annular chamber 51 it flows around plate 60. As liquid flows around plate 60 contaminants which are denser than water are deposited in sludge collector The fluid enters the second stage 32 as indicated by the arrows 62. In the second stage, polyethylene beads 77 attract oil droplets due to their oleophilic property. Preferably, oil droplets coalesce and gradually from an oil layer on plate 78. The upper region of the oil layer extends into the mass of polyethylene beads 77. As more oil droplets are admitted into second stage 32, the thickness of the oil layer tends to increase. Consequently the lower region of the oil layer can migrate towards the periphery of second stage 32 assisted by the fluid flow. When the oil layer is sufficiently thick, excess oil exits second stage 32 through orifices 61 and is funnelled by baffle 63 towards primary collection zone 44. The thickness of the oil layer is maintained relatively constant.

The oil layer on plate 78 helps to break down emulsified oil entrained in the flowing fluid. Emulsified oil otherwise tends to remain in suspension and is hard to separate. When a particle of oil/water emulsion carried by the flow encounters the oil layer on plate 78 it becomes entrapped within the mass of oil. Eventually the oil layer absorbs the emulsified oil.

Other oil droplets float upwards with the flow through polyethylene beads 77. An oil droplet adhering to a polyethylene bead 77 coalesces with other droplets also adhering to the polyethylene bead. The resulting larger oil droplet has an enhanced buoyancy which overcomes the attraction between the polyethylene bead and the oil droplet. As the oil droplet rises it encounters other polyethylene beads and the process continues. Eventually the oil droplet leaves beads 77 and floats upwardly with the fluid flow into secondary collection zone 42.

The fluid flow causes beads 77 to move freely against perforated plate 79. This speeds up the coalescing process by bringing together oil droplets adhering to adjacent beads 77. At the same time the action of the polyethylene beads 77 rubbing against each other and against plate 79 releases the oil droplets and other contaminants in a self-cleaning process.

The liquid ascending through region 80 follows arrows 84 into region 88 of stage 33 through an annular passage. In most areas within region 88 the velocity of the flowing fluid is reduced and so smaller oil droplets can float upwardly toward secondary collection zone 42 under the influence of gravity.

Pump 27 transfers the liquid from region 88 into stage 34. It can be appreciated that the oil content of the fluid is greatly reduced by the time the fluid reaches pump 27 so that pump 27 does not cause emulsification of any significant quantities of oil.

In stage 34 the liquid swirls at high velocity. Any oil droplets entrained in the fluid experience a radially directed inward force because they are less dense than water. This causes oil droplets to migrate towards tube 100 which lies on the axis of hydrocyclone 95.

Some liquid and oil droplets enter tube 100 through perforations in the lower part of tube 100. If there are polyethylene beads inside tube 100, which is preferred, the beads help oil droplets to coalesce with each other as described above. The flow inside tube 100 carries oil particles upwardly through any beads inside tube 100. Larger oil droplets leave the tube 100 into region 104 through orifices in dispersion plate 109. From region 104 oil droplets are drawn into secondary collection zone 42 through conduit 106.

There is a pressure differential between the ends of pipe 106 which tends to drive oils through pipe 106 into secondary collection zone 42. The pressure differential arises because the inlet to pipe 106 is in region 104 which is on the discharge side of pump 27 and the outlet of pipe 106 is in secondary collection zone 42, which is on the suction side of pump 27.

Liquid which does not enter tube 100 is accelerated towards the cone shaped end of chamber 101 from where it is ejected through an annular opening into chamber 110. As shown in FIG. 4, the fluid emerging from hydrocyclone 95 is deflected by the enlarged frustoconical upper end of tube 100 and dispersion plate 109 as it enters the chamber 110.

It should be appreciated that, because hydrocyclone 95 is completely inside separator 20, damage to hydrocyclone cannot directly result in an oil spill. Rather, a failure of hydrocyclone 95 would merely degrade the performance of separator 20.

In chamber 110, there are few oil particles still remaining. The fluid passes through screen 112 (which, as noted above is preferably filled with beads 111) and into region 115. Oil particles still entrained in the water in chamber 110 are prevented from descending into region 115 by their own bouyancy, the forces exerted on them by the spinning motion of the fluid and by beads 111. Fluid which reaches region 115 is delivered to chamber 126 through pipe 119 which is connected to manifold 123.

The separation may be completed in chamber 126 without the use of any filters. Tests conducted in accordance with the IMO 393/x and U.S. Coast Guard procedures indicated that the quality of fluid reaching chamber 126 exceeds the requirements. Nevertheless, the use of the filters is preferred, especially when the effluent is required to have a particularly high purity or the influent fluid is contaminated with oils of high density. In tests of a separator 20 in which filters 120, 140 were used the oil content in the treated effluent was less than approximately 2 ppm.

From manifold 123 the fluid is pumped into filters 120 through the tubes 122. A coalescing process occurs on the interior surface of the filter media in filters 120. The minute amounts of oil which collect inside filters 120 finds its way to secondary collection zone 42 through conduit 129.

The fluid exiting filters 120 flows from region 125 towards the top of the chamber 126 over separation plate 130 and down toward back-up filters 140.

Minute amounts of oil which collect at the top of chamber 126 are removed from the chamber 126 by conduit 134. Both of conduits 129 and 134 exploit the pressure differential between chamber 126 and collection zone 42 to drive oil through into collection zone 42.

The fluid passes into filters 140 from the exterior. Fluid inside filters 140 enters tubes 122 and leaves the separator via manifold 124 and line 144. Valve 54 then directs the effluent overboard through line 40.

The separator is backflushed automatically to remove the oil accumulated in the collection zones 42 and 44. The oil discharge sequence operates as follows.

As oil accumulates in primary collection zone 44 the oil-water interface moves downwards until it reaches the lowermost probe of oil sensor probes 70. The signal provided by probe 70 to control unit 160 changes as the oil-water interface passes probe 70. In response to this signal, control unit 160 de-energizes valves 90 and 54 and shuts down pump 27. Then control unit 160 energizes the actuator of valve 52 to connect water supply line 50 to line 181.

Figure 8C:
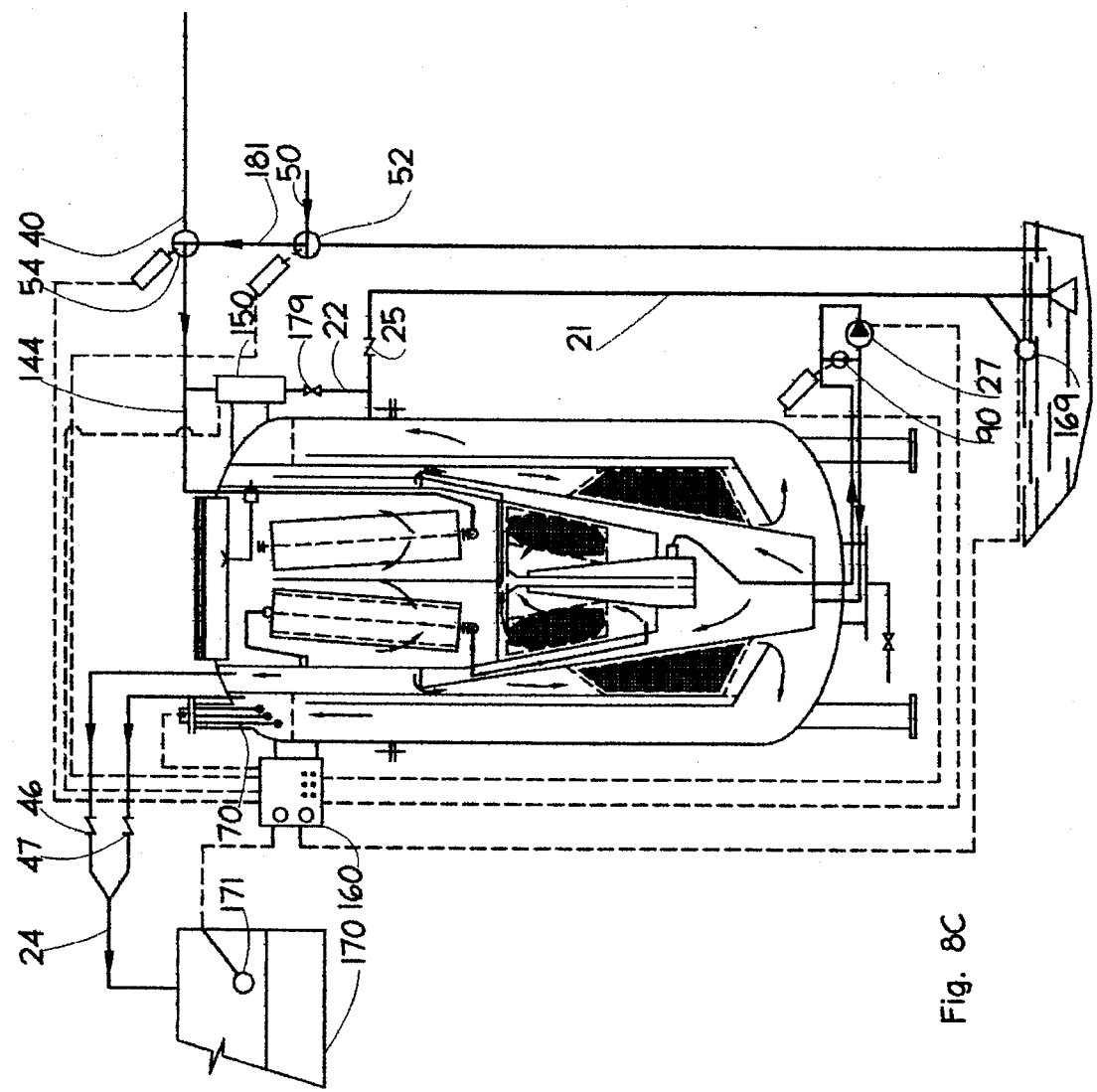

As shown in FIG. 8C, clean water then flows into separator 20 through valve 54. The flow of clean water through separator 20 is in the reverse direction to the flow of fluid described above. The clean water displaces oil from collection zones 42 and 44 into holding tank 170. As the oil is discharged the oil-water interface in primary collection zone 44 rises. Probes 70 sense clean water. When the uppermost one of probes 70 senses clean water, its signal to control unit 160 changes and control unit 160 resumes the separation process as described above.

It is undesirable to continue backflushing separator 20 for too long as this would fill holding tank 170. To prevent the continuous back flushing which could occur if one of probes 70 was not operating properly, timer 161 begins counting a fixed time interval at the start of the back flushing sequence. If probes 70 fail to detect the back flushing water before timer 161 finishes counting its time interval then timer 161 terminates the backflushing sequence and indicates "probe fault" by means of a pilot light on the control unit.

The cycle of separation and back-flushing ends when the liquid level in the bilge drops to a predetermined level as detected by the sensor 169. Control unit 160 then places separator 20 in stand-by mode as shown in FIG. 8A and as described above. Preferably, control unit 160 backflushes separator 20 for a set interval before placing separator 20 in stand-by mode. The back-flushing cleans any oil from the working parts of oil-water separator 20.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. A separator for removing an immiscible fluid from a fluid denser than the immiscible fluid, said separator comprising:
   a. a fluid inlet upstream from an outlet, said separator providing a path for flow of said fluid through said separator from said inlet to said outlet;
   b. a toroidal separation chamber in said path downstream from said inlet said separation chamber having a tangentially disposed inlet for causing said fluid to swirl within said separation chamber;
   c. a pump in said path, said pump having a suction port and a discharge port, said suction port in fluid communication with and downstream from said separation chamber; and
   d. a bed of buoyant oleophilic plastic beads in said path and downstream from said separation chamber.

2. The separator of claim 1 further comprising a filter in said path upstream from an outlet in fluid communication with said discharge port.

3. The separator of claim 2 wherein said filter is downstream from said pump.

4. The separator of claim 1 wherein said beads are polyethylene beads.

5. The separator of claim 1 wherein said beads are in the range of 1 to 10 millimeters in diameter.

6. The separator of claim 5 wherein said beads are polyethylene beads.

7. The separator of claim 1 further comprising an annular plate in said separation chamber, said plate perforated by apertures smaller than said beads, wherein said beads float against an underside of said annular plate and are free to move relative to one another.

8. The separator of claim 7 further comprising a layer of oil on an underside of said beads and means for maintaining said layer of oil relatively constant in thickness.

9. The separator of claim 7 wherein said beads are separated from said toroidal separation chamber by a wall, said separator further comprising a baffle in said toroidal separation chamber spaced apart from said wall, said wall having at least one aperture extending through said wall below said beads, said baffle extending from a level below said apertures to a level above said inlet.

10. The separator of claim 1 further comprising a hydrocyclone chamber in said path between said discharge port of said pump and said outlet, said hydrocyclone chamber comprising a generally conical chamber having a larger diameter end and a smaller diameter end, an input nozzle tangentially disposed at said larger diameter end and a chamber outlet at said smaller diameter end.

11. The separator of claim 10 further comprising a tube axially disposed within said hydrocyclone chamber, said tube having a perforated wall in a region toward said larger diameter end of said chamber.

12. The separator of claim 11 wherein said hydrocyclone chamber outlet is an annular region between said tube and an outer wall of said chamber.

13. The separator of claim 12 further comprising a plurality of polyethylene beads inside said tube.

14. The separator of claim 13, further comprising a dispersion plate spaced apart from said chamber outlet and extending generally perpendicularly to said tube.

15. The separator of claim 1 further comprising an oil-collection zone in an upper region of said separation chamber above said tangential inlet.

16. The separator of claim 15 further comprising a conduit connecting said oil-collection zone to a holding tank, a one way valve in said conduit and a pressurized water supply line connectible to said outlet for backflushing said separator and forcing oil from said oil-collection zone through said conduit into said holding tank.

17. The separator of claim 16 further comprising a sensor in said oil-collection zone for detecting a level of oil in said oil collection zone and triggering a controller to initiate a process for forcing oil from said oil-collection zone when said oil level is at a predetermined level.

18. The separator of claim 17 further comprising a timer operatively associated with said controller for terminating said process for forcing oil from said oil-collection zone after a predetermined time.

19. An oil water separator comprising:
   a) a first toroidal separation chamber having a tangentially disposed fluid inlet on an outer wall thereof an oil collection zone above said fluid inlet and an annular outlet at a lower end thereof;
   b) a second toroidal chamber generally coaxial with and inside said first toroidal separation chamber, said second toroidal chamber having a second oil collection zone at an upper end thereof an outwardly inclined perforated plate at a lower end thereof, and a toroidal bed of polyethylene beads floating between said perforated plate and a fluid permeable member above said plate;

c) a settling chamber in fluid communication with said second toroidal chamber;

d) a pump having a suction port in fluid communication with said settling chamber and a discharge port;

e) a hydrocyclone chamber disposed generally coaxially inside said second toroidal chamber, said hydrocyclone chamber having a larger diameter end and a smaller diameter end, a tangential fluid inlet in fluid communication with said pump discharge port at said larger diameter end, a tube axially disposed within said chamber, said tube having a perforated wall in a region toward said larger diameter end of said hydrocyclone chamber an annular outlet at said smaller diameter end of said hydrocyclone chamber and a diffuser plate extending outwardly from said tube and spaced apart from said annular outlet;

f) an oil collection area above said diffuser and above an upper end of said tube;

g) a conduit extending from said oil collection area to said second oil collection zone;

h) a third chamber below said diffuser plate extending around said hydrocyclone;

i) a conduit for carrying fluid from said third chamber to a filter in a filter chamber;

j) a conduit extending from an upper region in said filter chamber to said second oil collection zone; and k) an effluent outlet in said filter chamber.

20. The oil water separator of claim 19 wherein said oil water separator is entirely contained within a single pressure tight tank.

\* \* \* \* \*